United States Patent [19]
Verardi et al.

[11] Patent Number: 5,863,646
[45] Date of Patent: Jan. 26, 1999

[54] COATING COMPOSITION FOR PLASTIC SUBSTRATES AND COATED PLASTIC ARTICLES

[75] Inventors: Christopher A. Verardi, Pittsburgh; Lawrence D. Meyers, Allison Park; William A. Humphrey, Pittsburgh, all of Pa.

[73] Assignee: PPG Industries, Inc., Pittsburgh, Pa.

[21] Appl. No.: 622,194

[22] Filed: Mar. 25, 1996

[51] Int. Cl.$^6$ ............... B32B 5/16; A31F 1/00; C08K 5/11

[52] U.S. Cl. ............ 428/323; 428/336; 428/515; 524/314; 524/385; 524/458; 525/123

[58] Field of Search ............... 428/515, 336, 428/323; 524/301, 314, 385, 458; 525/123

[56] References Cited

U.S. PATENT DOCUMENTS

| | | | |
|---|---|---|---|
| Re. 27,145 | 6/1971 | Jones | 260/880 |
| 4,039,593 | 8/1977 | Kamienski et al. | 260/635 |
| 4,046,729 | 9/1977 | Scriven et al. | 260/29.2 |
| 4,066,591 | 1/1978 | Scriven et al. | 260/29.2 TN |
| 4,147,679 | 4/1979 | Scriven et al. | 260/29.2 |
| 4,147,688 | 4/1979 | Makhlouf et al. | 260/33.6 |
| 4,403,003 | 9/1983 | Backhouse | 427/408 |
| 4,403,085 | 9/1983 | Christenson et al. | 528/45 |
| 4,997,882 | 3/1991 | Martz et al. | 525/65 |
| 5,039,755 | 8/1991 | Chamberlain et al. | 525/338 |
| 5,071,904 | 12/1991 | Martin et al. | 524/458 |
| 5,096,954 | 3/1992 | Yamada et al. | 524/385 |
| 5,300,326 | 4/1994 | Zezinka et al. | 427/385.5 |
| 5,319,032 | 6/1994 | Martz et al. | 525/301 |
| 5,354,618 | 10/1994 | Ishigaki et al. | 428/424.8 |
| 5,356,973 | 10/1994 | Taljan et al. | 524/314 |
| 5,376,745 | 12/1994 | Handlin, Jr. et al. | 526/178 |
| 5,397,602 | 3/1995 | Martz et al. | 427/343.5 |
| 5,416,168 | 5/1995 | Willis et al. | 525/333.2 |
| 5,436,079 | 7/1995 | Brugel | 428/483 |
| 5,486,570 | 1/1996 | St. Clair | 525/123 |

FOREIGN PATENT DOCUMENTS 0 601 665  6/1994  European Pat. Off. .

OTHER PUBLICATIONS

Encyclopedia of Chemical Technology, Supplement vol., 2nd ed. 1971, pp. 889 to 909.

Patent Abstracts of Japan, vol. 5, No. 28, Aug. 1981, Publ. No. JP 56–065054 entitled "Undercoating for Japanese Lacquer".

*Primary Examiner*—H. Thi Le
*Attorney, Agent, or Firm*—Kenneth J. Stachel

[57] ABSTRACT

A liquid coating composition, comprising (a) from about 5 to 100 percent of resin solids of a mixture of (i) a substantially saturated polyhydroxylated polydiene polymer, having terminal hydroxyl groups, and (ii) a chlorinated polyolefin, wherein the weight of the polydiene polymer is between about 5 and 95 percent of the total weight of the mixture of polyhydroxylated polydiene polymer and chlorinated polyolefin; (b) about 0 to about 95 percent by weight of resin solids of a film forming polymer selected from liquid and carrier-reducible film forming polymers; and (c) a carrier material. The liquid coating composition can be solvent-based or aqueous based and can additionally contain at least on pigment. The liquid coating composition can be coated onto plastic substrates to improve the adhesion of subsequently applied coatings and to substantially improve the solvent resistance, especially to gasoline, of the finally coated plastic part.

19 Claims, No Drawings

1

COATING COMPOSITION FOR PLASTIC SUBSTRATES AND COATED PLASTIC ARTICLES

BACKGROUND OF THE INVENTION

The present invention relates to coatings compositions for thermoplastic and thermosetting plastic materials and the coated plastic articles.

Plastic materials such as thermoplastic olefin (TPO) have been developed which are useful in many applications, such as automobile parts and accessories, containers, household appliances, and other commercial items. It is often desirable to coat articles made from such plastic materials with organic coating compositions to decorate them or to protect the plastic materials from degradation when exposed to atmospheric weathering conditions such as sunlight, moisture, heat and cold. To achieve longer lasting and more durable parts, it is necessary for the coatings to be tightly adhered to the surface of the plastic.

Plastic substrates made from a variety of thermoplastic and thermosetting plastic materials have widely varying surface properties including surface tension, roughness, and flexibility, which make it difficult to achieve adequate adhesion of the organic coatings to such materials, particularly after aging or environmental exposure of the plastic materials. The problems are particularly difficult in automotive applications where in addition to the requirement that decorative and protective coatings adhere well to the plastic substrate, there are other requirements which are difficult to achieve. In respect to the utilization of thermoplastic polyolefin substrates, these requirements include a high degree of resistance of the finally coated part to organic solvents, particularly gasoline, and a high degree of resistance of any hardened coating to humidity.

A number of proposals have been made for overcoming the adhesion problem ranging from flame or corona pretreatments to the application of various primer compositions containing chlorinated polyolefins to the plastic polyolefin substrate. Some examples of chlorinated polyolefins for use in coating compositions can be found in U.S. Pat. Nos. 4,997,882; 5,319,032; and 5,397,602.

However, while such techniques have achieved a fair measure of success with respect to the adhesion problem, there remain various disadvantages such that the goal, for example, of achieving a desired combination of excellent adhesion, solvent resistance, particularly to gasoline, and humidity resistance in an advantageously economic manner has remained elusive.

It is an object of the present invention to provide a coating composition for use on thermoplastic polyolefin substrates that provides excellent adhesion, humidity resistance, and solvent resistance, particularly to gasoline.

It is another object of the present invention to provide a thermoplastic polyolefin article coated with the coating composition of this invention.

SUMMARY OF THE INVENTION

In accordance with the present invention, there is provided a coating composition comprising (a) from about 5 to 100 percent of resin solids of a mixture of a substantially saturated polyhydroxylated polydiene polymer and a chlorinated polyolefin, (b) from 0 to 95 percent of resin solids of film forming resins, and (c) a solvent. In mixture (a) the weight of the polydiene polymer is between about 5 and 95 percent of the total weight of the mixture of the polyhydroxylated polydiene polymer and the chlorinated polyolefin. The coating composition can be either a solvent-based or aqueous-based coating composition. Additionally, the coating can contain pigments.

Also provided are thermoplastic polyolefin articles coated with about 0.01 to 1.0 mils (0.25 to 25.4 microns ($\mu$)) of the coating composition of the present invention.

DETAILED DESCRIPTION OF THE INVENTION

Polyhydroxylated polydiene polymers made using isoprene or butadiene as described in U.S. Pat. Nos. 5,486,570 and 5,376,745, which are substantially saturated are suitable for use in the present invention. By the term "substantially saturated", it is meant that the polyhydroxylated polydiene polymer has been hydrogenated such that at least 90 percent and preferably at least 95 percent of the carbon to carbon double bonds of the polyhydroxylated polydiene polymer are saturated. Polyhydroxylated polydiene polymers of this type generally have an hydroxyl equivalent weight of between 500 and 20,000. Preferably, the saturated polyhydroxylated polydiene polymer is a dihydroxy polybutadiene which contains two terminal hydroxyl groups, one at each end of the polymer, and having an hydroxyl equivalent weight of about 1,500 to 3000.

The substantially saturated polyhydroxylated polydiene polymers are known as synthesized products of anionic polymerization of conjugated diene hydrocarbons, such as butadiene or isoprene, with lithium initiators. The process steps are known as described in U.S. Pat. Nos. 4,039,593; Re. 27,145; and 5,376,745, all of which are hereby incorporated by reference for their disclosure of preparing polyhydroxylated polydiene polymers. Such polymers have been made with di-lithium initiator, such as the compound formed by reaction of two moles of sec-butyllithium with one mole of diisopropylbenzene. Such a polymerization of butadiene has been performed in a solvent composed of 90% by weight cyclohexane and 10% by weight diethylether. The molar ratio of di-initiator to monomer determines the molecular weight of the polymer. The polymer is capped with two moles of ethylene oxide and terminated with two moles of methanol to produce the dihydroxy polybutadiene. The hydroxylated polydiene polymer is hydrogenated where substantially all of the carbon to carbon double bonds become saturated. Hydrogenation has been performed by those skilled in the art by established processes including hydrogenation in the presence of such catalysts as Raney Nickel, nobel metals such as platinum and the like, soluble transition metal catalysts and titanium catalysts as in U.S. Pat. No. 5,039,755. Suitable polyhydroxylated polydienes are those available from Shell Chemical Company in the U.S.A. under the trade designation of KRATON LIQUID™ POLYMERS, HPVM 2200 series products.

Polyhydroxylated polydiene polymers used in the claimed coating composition have been used in polyurethane sealants and adhesives as described in U.S. Pat. No. 5,486,570, hereby incorporated by reference. However, the present invention uses polyhydroxylated polydiene polymers in a mixture with chlorinated polyolefin in an organic solvent-based or aqueous-based coating composition which has adhesion when applied directly to thermoplastic and thermosetting plastic material substrates and also has excellent gasoline resistance.

Generally, any of the chlorinated polyolefins known to those skilled in the art can be used such as chlorinated grafted or ungrafted polyolefins and chlorinated polypropylene, chlorinated polybutene, chlorinated polyethylene, and mixtures thereof. The chlorinated polyolefin polymers may have weight average molecular weights from as low as 5,000 to as high as 200,000, more suitably about 10,000 to about 40,000. Also, the chlorinated polyolefin polymer can be a chlorosulfonated olefin polymer or a blend of the chlorinated polyolefin polymer with the chlorosulfonated olefin polymer, where chlorosulfonation may be effected by reaction of the grafted or non-grafted base resin with a chlorosulfonating agent. For use in the present compositions and methods, the chlorinated polyolefin materials can be selected from commercially available materials such as those supplied by Eastman Chemical Company, Kingsport, Tenn. under the trade name CPO-343-1 (100%). Other commercially available materials that may be employed under certain conditions include PM 12075-00 and 12075-OF, also supplied by Eastman Chemical Company, and CP-26P, CP-30P and CP-32P, products of Toyo Kasei Kogyo Co. Ltd., Osaka, Japan. The chlorinated polyolefins generally can have a melting point in the range of about 150° F. to about 350° F. (65° to 177° C.).

The non-grafted olefin polymer for chlorination can be homopolymers of alpha monoolefins with 2 to 8 carbon atoms, and the copolymers can be of ethylene and at least one ethylenically unsaturated monomer like alpha monoolefins having 3 to 10 carbon atoms, alkyl esters with 1 to 12 carbon atoms of unsaturated monocarboxylic acids with 3 to 20 carbon atoms, and unsaturated mono- or dicarboxylic acids with 3 to 20 carbon atoms, and vinyl esters of saturated carboxylic acids with 2 to 18 carbon atoms.

The graft copolymer base resins are reaction products of an alpha-olefin polymer and a grafting agent. The alpha-olefin homopolymer of one or copolymer of two alpha-olefin monomers with two to eight carbon atoms can include: a) homopolymers such as polyethylene and polypropylene, and b) copolymers like ethylene/propylene copolymers, ethylene/1-butene copolymers, ethylene/4-methyl-1-pentene copolymers, ethylene/1-hexene copolymers, ethylene/1-butene/1-octene copolymers, ethylene/1-decene copolymers, ethylene/4-ethyl-1-hexene copolymers, and ethylene/4-ethyl-1-octene copolymers. The chlorinated grafted polypropylene can be prepared by solution chlorination of a graft-modified polypropylene homopolymer or propylene/alpha-olefin copolymer. Such grafting polymerization is usually conducted in the presence of a free radical catalyst in a solvent which is inert to chlorination. Fluorobenzene, chlorofluorobenzene carbon tetrachloride, and chloroform and the like are useful solvents. Typically, such grafted polypropylenes are those base resins that have been grafted with an alpha, beta-unsaturated polycarboxylic acid or an acid anhydride of an alpha, beta-unsaturated anhydride to form an acid-and/or anhydride-modified chlorinated polyolefin. Suitable grafting agents generally include maleic acid or anhydride and fumaric acid and the like.

Also suitable are any modified chlorinated polyolefins known to those skilled in the art. Modified chlorinated polyolefins can include those modified with an acid or anhydride group. Some examples of modified chlorinated polyolefins are described in U.S. Pat. Nos. 4,997,882 (column 1, line 26 to column 4, line 63); 5,319,032 (column 1, line 53 to column 2, line 68); and 5,397,602 (column 1, line 53 to column 2, line 68), hereby incorporated by reference. The chlorinated polyolefins preferably have a chlorine content of from about 10 to 40 weight percent, more preferably from about 10 to 30 weight percent based on the weight of polyolefin; i.e., the unchlorinated polyolefin. One suitable example of a modified chlorinated polyolefin is the modified chlorinated polyolefin that has a chlorine content of from about 10 to about 30 weight percent based on the weight of polyolefin, and is at least partially neutralized with an amine, and has an acid value in the range of about 50 to about 100. An additional example of the modified chlorinated polyolefin is an aqueous dispersion comprising water, a coalescing solvent, and a dispersed resinous phase having about 20 to about 100 percent by weight of an at least partially neutralized modified chlorinated polyolefin obtained by heating a chlorinated polyolefin with a hydrocarbon acid having at least 7 carbon atoms in the presence of a free radical initiator. Such a modified chlorinated polyolefin can be present in an amount of the about 20 to about 100 percent by weight of the dispersion in water with an organic cosolvent. The preferred chlorinated polyolefin for water based coatings is the modified chlorinated polypropylene modified with undecylenic acid, such as CP343-1.

In the claimed coating composition, from about 5 to 100 percent of the resin solids is made up of a mixture of the polyhydroxylated polydiene polymer and the chlorinated polyolefin. In this mixture, the weight of the polydiene polymer is from about 5 to 95 percent, preferably from about 5 to 70 percent, and more preferably from about 5 to 40 percent of the weight of the mixture of polyhydroxylated polydiene polymer and chlorinated polyolefin. When the polyhydroxylated polydiene polymer is present in the mixture at levels less than 5 weight percent and levels greater than 95 weight percent, the solvent resistance, especially to gasoline decreases to unacceptable levels.

When the claimed coating composition is solvent-based, the coating composition is made by mixing together a suitable chlorinated polyolefin, a modified chlorinated polyolefin or mixtures thereof with a saturated polyhydoxylated polydiene polymer, preferably a polybutadiene diol polymer.

When the claimed coating composition is aqueous-based, the coating composition is made by mixing aqueous dispersions of a suitable chlorinated polyolefin, modified chlorinated polyolefin or mixtures thereof with a saturated polyhydroxylated polydiene polymer, preferably a polybutadiene diol polymer. Examples of aqueous dispersions of chlorinated polyolefins are described in U.S. Pat. Nos. 5,319,032 and 5,397,602. The saturated polyhydroxylated polydiene polymer can be dispersed in water by any technique known in the art. One technique described in European Patent Application No. 601,665 includes heating the polydiene polymer until its viscosity is less than 3000 centipoise, adding a mixture of water and surfactant under high speed agitation, cooling the dispersion and then optionally subjecting the dispersion to turbulent flow and/or cavitation in an apparatus such as a MICROFLUIDIZER available from Microfluidics Corporation, Newton, Mass.

Optionally, the coating composition can contain pigments conventionally used in coating compositions including inorganic pigments such as titanium dioxide, talc, mica, iron oxides, lead oxides, chromium oxides, lead chromate and carbon black, including conductive carbon black, and organic pigments such as phthalocyanine blue and phthalocyanine green, as well as a variety of other color pigments. In general, the total amount of pigment incorporated into the coating composition is in amounts of from about 1 to about 80 percent by weight based on weight of the resin solids of the composition.

The coating compositions of the present invention can also contain one or more other resinous film-forming ingredients such as acrylic, and alkyd polymers. By the term "film forming", it is meant that the resinous or polymeric material upon curing at an ambient or elevated temperature forms a self-supporting continuous film on at least a horizontal surface and even includes polymeric materials that upon removal of any solvents or carriers present in the polymer emulsion, dispersion, suspension or solution, can coalesce to form a film on at least a horizontal surface and is capable of curing into a continuous film. When the coating composition is aqueous-based, the resinous film-forming ingredients can include water-reducible acrylic and urethane resins and acrylic latices and/or dispersions. Coating compositions formulated with these additional resins and applied to a substrate provide enhanced adhesion of subsequently applied coatings, as well as humidity resistance, gasoline and other chemical resistance, and excellent appearance of subsequently applied and cured films.

When the coating composition of the present invention is aqueous-based, it contains about 20 to 100 percent, preferably about 30 to 40 percent by weight of the chlorinated polyolefin, polyhydroxylated polydiene polymer mixture described above, about 0 to 40 percent, preferably about 20 to 30 percent by weight of a water-reducible urethane resin, and about 0 to 40 percent, preferably about 35 to 45 percent by weight of an acrylic latex, based on total weight of resin solids. Suitable water-reducible urethane resins include those described in U.S. Pat. Nos. 4,046,729; 4,066,591; 4,147,679 and 4,403,085. Suitable acrylic latices include those described in U.S. Pat. No. 5,071,904 and resins commercially available from Rohm and Haas under the trademark RHOPLEX; i.e., RHOPLEX WL-91, RHOPLEX WL-96, and RHOPLEX AC-264, which is preferred. The coating composition of the present invention may have or also include water-reducible acrylic resins prepared by reacting suitable acrylic and other ethylenically unsaturated monomers, including acid functional monomers, by conventional solution polymerization techniques and dispersing into a mixture of water and amine. Preparation of these types of water-reducible acrylic resins is described in U.S. Pat. No. 5,096,954. The water-reducible acrylic resin may be present in an amount ranging from about 0 to 5 percent by weight, preferably about 2.5 percent by weight, based on total weight of resin solids. The solids content of the coating composition is usually in the range of about 10 to 50 percent, preferably 20 to about 25 percent by weight, based on total weight of the coating composition.

The coating composition, when aqueous based, may also contain one or more coalescing solvents. Examples include propylene carbonate, glycols including ethylene glycol, diethylene glycol, propylene glycol, polypropylene glycol, and 2,2,4-trimethyl pentane-1,3-diol, glycol ether alcohols including ethylene glycol butyl ether, diethylene glycol butyl ether, ethylene glycol hexyl ether, propylene glycol methyl ether, propylene glycol propyl ether, and propylene glycol phenyl ether, lower alcohols including isopropanol, butanol, p-amyl alcohol, and tridecyl alcohol, and the like. Ethylene glycol hexyl ether is preferred. The coalescing solvent may be present in amounts ranging from about 5 to 40 percent by weight, preferably about 15 to 30 percent by weight based on total solids weight of the aqueous dispersion.

When the claimed coating composition is solvent-based, it contains about 5 to 100 percent, preferably about 15 to 60 percent by weight of the chlorinated polyolefin, polyhydroxylated polydiene polymer mixture described above, and about 0 to 95 percent, preferably about 40 to 85 percent by weight of an acrylic or alkyd resin, based on resin solids.

The acrylic polymers are copolymers of one or more alkyl esters of acrylic acid or methacrylic acid optionally together with one or more other polymerizable ethylenically unsaturated monomers. These polymers may be either of the thermoplastic type or thermosetting crosslinking type. Suitable alkyl esters of acrylic acid or methacrylic acid include methyl methacrylate, isobutyl methacrylate, methyl styrene dimer, ethyl methacrylate, butyl methacrylate, ethyl acrylate, butyl acrylate and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The acrylic polymer may be prepared by solution polymerization techniques or may be prepared by aqueous emulsion or dispersion polymerization techniques.

Besides acrylic polymers, the coating composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the polycarboxylic acids such as anhydrides where they exist or lower alkyl esters of the polycarboxylic acids such as the methyl esters may be used. Where it is desired to produce air-drying alkyd resins, suitable drying oil fatty acids maybe used and include those derived from linseed oil, soya bean oil, tall oil, dehydrated castor oil or tung oil. The polyesters and preferably the alkyd resins can contain a portion of free hydroxyl and/or carboxyl groups which are available for further crosslinking reaction.

The coating composition, when solvent-based, may contain suitable solvents. Examples include aromatic solvents such as toluene, xylene, and naptha; alcohols such as ethyl, methyl, n-propyl, isopropyl, n-butyl, isobutyl and amyl alcohol, and m-pyrol; esters such as ethyl acetate, n-butyl acetate, isobutyl acetate, isobutyl isobutyrate, and oxohexyl acetate; ketones such as acetone, methyl ethyl ketone, methyl isobutyl ketone, diisobutyl ketone, methyl n-amyl ketone, and isophorone. Additional solvents include glycol ethers and glycol ether esters such as ethylene glycol monobutyl ether, diethylene glycol monobutyl ether, ethylene glycol monohexyl ether, propylene glycol monomethyl ether, propylene glycol monopropyl ether, dipropylene glycol monoethyl ether, ethylene glycol monobutyl ether acetate, propylene glycol monomethyl ether acetate, and dipropylene glycol monomethyl ether acetate, dipropylene glycol monoethyl ether acetate.

The coating composition may also include an aminoplast crosslinking agent containing methylol and/or methylol ether groups. Aminoplast condensates are obtained from the reaction of formaldehyde with an amine or amide. The most common amines or amides are melamine, urea, or benzoguanamine, and are preferred. The aminoplast may be present in an amount ranging from 0 to about 35 percent by weight, preferably from 0 to about 20 percent by weight based on the total weight of resin solids.

The coating composition can also contain catalysts to accelerate the cure of any aminoplast in the formulation. Examples of suitable catalysts are acidic materials and include sulfonic acid or a substituted sulfonic acid such as paratoluene sulfonic acid and dodecylbenzene sulfonic acid. The catalyst is usually present in an amount of about 0 to 5.0 percent by weight, preferably, when present, about 1 to 2 percent by weight, based on total weight of resin solids.

Optionally, solvents, pigments, and other additives generally known for use in organic coating compositions containing film forming resins of these general classes including fillers, plasticizers, antioxidants, mildewcides and fugicides, surfactants, wetting agents, thickeners, and various flow control agents can be added to the coating composition. These optional ingredients can be present at up to 40 percent by weight based on total weight of solids of the coating composition.

Generally, for organic solvent-based coating compositions, the components can be added in any order under agitation, in a suitable container, under ambient conditions. When water is used as the solvent to make an aqueous-based coating composition, the components are added under agitation in a suitable container in an order to obtain the proper oil in water inversion. Alternatively, the polyhydroxylated polydiene polymer can be emulsified using microfluidization as aforementioned, and then mixed under agitation with the other components.

Although the coating composition of the present invention may be applied to various substrates including wood, metals, and glass, they are particularly effective as adhesion promoters over plastic substrates. By "plastic" is meant any of the common thermoplastic or thermosetting synthetic nonconductive materials, including thermoplastic olefins such as polyethylene and polypropylene, thermoplastic urethane, polycarbonate, sheet molding compound, reaction-injection molding compound, acrylonitrile-based materials, nylon, and the like.

The coating composition of the present invention, which is preferably thermoplastic, may be applied to a substrate by any conventional coating technique such as brushing, spraying, dipping or flowing, but spray applications are preferred. Any of the known spraying techniques may be employed such as compressed air spraying and by either manual or automatic methods.

The claimed coating composition may be utilized as a sole film-forming composition on a substrate or may be utilized, for example, as an adhesion promoter between the substrate and subsequently applied organic film-forming compositions. The coating composition of the present invention may be applied to a plastic substrate with or without pretreatment of the substrate. Such pretreatment may include, for example, plasma treatment, flame treatment, abrasive sanding, and/or chemical cleaning with a solvent such as ethanol, methanol, naphtha, mineral spirits, methyl isobutyl ketone, acetone, or other suitable solvents.

After application of the coating composition, the coated substrate is flashed at room temperature and then optionally baked. In the baking operation, solvents are driven off. The baking operation is usually carried out at a temperature in the range of from 160° to 275° F. (71° to 135° C.) for approximately 30 minutes, but lower or higher temperatures and times may be used as necessary. The dry film thickness of the coating is usually from about 0.1 to 0.5 mils (2.54 to 12.7μ). A pigmented primer and/or a pigmented basecoat composition which is different from the claimed coating composition may subsequently be applied on top of the film of the claimed coating composition. A clear coating composition may optionally be applied to the continuous film of the basecoat. The primer and/or basecoat and clearcoat may be any of those known to those skilled in the art, and one or more can be applied after baking the film of the claimed coating composition, or may be applied in a "wet-on-wet" configuration prior to the baking operation.

The invention will be further described by reference to the following examples which are presented for the purpose of illustration only and are not intended to limit the scope of the invention.

EXAMPLES

The following are examples of coating compositions of this invention, the methods of preparing and using the same, and the comparison of the claimed coating composition with a prior art compostion. Unless otherwise indicated, all parts are by weight.

Terms and abbreviations used in the following examples have the following meanings:

pbw means parts by weight.

DFT means dry film thickness in mils.

Tricut Adhesion refers to adhesion of the cured film to the TPO substrate according to Ford laboratory test method BI106-I using Nichiban tape. The value reported is the percent adhesion loss after four tape pulls.

Solvent Soak means resistance in minutes of the cured film to "lifting" from the scribed coated substrate after immersion in a 50/50 mixture (by volume) of toluene and Varnish Makers and Painters (VM&P) naptha. The solvent soak resistance to a 50/50 mixture of toluene and VM&P naptha is typically used in the art to indicate a coating's gasoline resistance.

Adhesion-H refers to adhesion of the cured film to the substrate after 240 hours in a constant humidity cabinet operating at 100 percent relative humidity and 37.8° C. as defined in American Society of Testing Materials (ASTM) 3359-B.

Example 1

This example illustrates the preparation of three solvent-based clear adhesion promoter compositions according to the present invention. The three adhesion promoter compositions illustrate different percentages of the weight of the polyhydroxylated polydiene polymer to the total weight of the polyhydroxylated polydiene polymer and the weight of the chlorinated polyolefin in the promoter composition. The percentage of polydiene polymer was 70 percent in promoter #1, 50 percent in promoter #2, and 30 percent in promoter #3. The components were mixed together under agitation in a suitable container, in the order listed below.

| Composition | Promoter #1 | Promoter #2 | Promoter #3 |
|---|---|---|---|
| Xylene | 960 | 900 | 840 |
| CY9020A[1] | 150 | 250 | 350 |
| HPVM 2203[2] | 70 | 50 | 30 |
| Toluene | 70 | 50 | 30 |

[1] A 20 percent solution of chlorinated polyolefin solution in toluene commercially available from Toyo Kasei Kogyo.
[2] A hydrogenated polybutadiene diol polymer containing terminal hydroxyl groups commercially available from Shell Chemical Company.

Example 2

This example illustrates the preparation of three aqueous-based clear adhesion promoter compositions according to the present invention. The three adhesion promoter compositions illustrate different percentages of the weight of the polyhydroxylated polydiene polymer to the total weight of the polyhydroxylated polydiene polymer and the weight of the chlorinated polyolefin in the promoter composition. The percentage of polydiene polymer was 10 percent in Promoter #1, 50 percent in Promoter #2, and 95 percent in Promoter #3. The components were mixed together under agitation in a suitable container, in the order listed below.

| Composition | Promoter #1 | Promoter #2 | Promoter #3 |
|---|---|---|---|
| CPO[1] | 562.5 | 312.5 | 31.2 |
| Emulsified Diol[2] | 25.4 | 126.9 | 241.1 |

[1]Modified chlorinated polyolefin prepared according to U.S. Pat. No. 5,319,032, Example I, reduced to 16 percent weight solids with water.
[2]An emulsion of HPVM-2203 in water containing 1 percent of TRITON N101, a non-ionic surfactant commercially available from Union Carbide Chemicals and Plastics Co., Inc., 1.4 percent dodecylbenzene sulfonic acid and 1.6 percent diisopropanol amine, the percentages based on weight of HPVM-2203, that was particulated with a MICROFLUIDIZER commercially available from Microfluidics Corporation. The emulsion was reduced with water to 39.4 percent total solids.

Example 3

This example illustrates the preparation a solvent-based pigmented adhesion promoter compositions according to the present invention. The percentage of the weight of the polyhydroxylated polydiene polymer to the total weight of the polyhydroxylated polydiene polymer and the weight of the chlorinated polyolefin in the promoter composition was 53.2 percent. The components were mixed together under agitation in a suitable container, in the order listed below.

| Composition | Total Weight |
|---|---|
| Xylene | 580 |
| Aromatic 100[1] | 98 |
| Aromatic 150[2] | 25 |
| CY9020A | 88 |
| HPVM-2203 | 20 |
| Amberlac 292X[3] | 23.2 |
| Black pigment dispersion[4] | 270 |
| RESIMENE 717[5] | 17.9 |
| Toluene | 20 |

[1]Commercially available from Exxon Chemicals
[2]Commercially available from Exxon Chemicals.
[3]An alkyd polymer available from Reichhold Chemical Co.
[4]A black pigment dispersion containing 111.5 pbw of xylene, 11.1 pbw Aromatic 100, 5.4 pbw Aromatic 150, 107.6 pbw CY9020A, 24.4 pbw Amberlac 292X, and 10 pbw XC-72R (conductive carbon black commercially available from Cabot Chemical Co.)
[5]Aminoplast crosslinking resin commercially available from Monsanto Chemical Co.

Example 4

This example illustrates the preparation of an aqueous-based pigmented adhesion promoter compositions according to the present invention. The percentage of the weight of the polyhydroxylated polydiene polymer to the total weight of the polyhydroxylated polydiene polymer and the weight of the chlorinated polyolefin in the promoter composition was 28.6 percent. The components were mixed together under agitation in a suitable container, in the order listed below.

| Composition | Total Weight |
|---|---|
| Hexyl CELLOSOLVE[1] | 16 |
| Isopropyl alcohol | 8.5 |
| Butyl acetate | 8.3 |
| CYMEL 1156[2] | 10 |
| HPVM-2203 | 10 |
| Deionized water | 178 |
| Black pigment dispersion[3] | 132 |
| TiO$_2$ pigment dispersion[4] | 33 |
| RHOPLEX AC-264[5] | 36.8 |
| CPO[6] | 156.3 |

[1]Ethylene glycol monohexyl ether commercially available from Union Carbide Chemicals and Plastics Co., Inc.
[2]Aminoplast crosslinking resin commercially available from American Cyanamid Company.
[3]Black pigment dispersion containing 4.3 pbw propylene glycol monomethyl ether; 4.3 pbw n-proproxy propanol; 88.6 pbw deionized water; 303 pbw of a water reducible polyurethane containing 40.6% diisocyanate, 22.3% neopentyl glycol adipate polyester, 22.3% polyether glycol, 9.1% dimethyl propionic acid, 2.5% ethylene diamine, 1.7% neopentyl glycol, 1.1% propylene imine and 0.45% butanol with an $M_w$ of about 100,000 and a viscosity of about 200 to 500 cps; and 40 pbw XC-72R (conductive carbon black commercially available from Cabot).
[4]Titanium dioxide dispersion containing 4.1 pbw propylene glycol monomethyl ether; 5.8 pbw deionized water; 28.4 pbw of a water reducible acrylic containing 35% butyl acrylate, 30% styrene, 18% butylmethacrylate, 8.5% hydroxy alkyl acrylate, and 8.5% acrylic acid with a weight average molecular weight of about 90,000 and a viscosity of about 500 cps.; 61.5 pbw titanium dioxide; and 0.2 pbw amine.
[5]Acrylic latex commercially available from Rohm & Haas.
[6]Modified chlorinated polyolefin prepared according to U.S. Pat. No. 5,319,032, example I, reduced to 16 percent weight solids with water.

Example 5

This example illustrates the comparison of the adhesion promoter compositions of Examples 1 to 4 with a commercial adhesion promoter, Promoter C. Additionally, Promoters A, B, D, and E illustrate adhesion promoter compositions where the percent by weight of the polyhydroxylated polydiene polymer is either greater than 95 percent, Promoters A and D, or less than 5 percent, Promoters B and E, of the total weight of the polyhydroxylated polydiene polymer and the chlorinated polyolefin in the coating composition.

Comparative adhesion promoter compositions:

Promoter A comprised HPVM-2203 at 100% of the resin solids and used as a 10% solution in xylene.

Promoter B comprised CY9020A at 100% of the resin solids and used as a 10% solution in xylene.

Promoter C was MWP4500, a pigmented aqueous-based adhesion promoter commercially available from PPG Industries, Inc.

Promoter D comprised emulsified HPVM-2203, prepared as in note 2 of Example 4 above, at 100% of the resin solids and used as a 10% solution in water.

Promoter E comprised the modified chlorinated polyolefin described in U.S. Pat. No. 5,319,032, Example I, at 100% of the resin solids and used as a 16% solution in water and phenolxy glycol.

The promoters of Examples 1 to 4, and Promoters A to E were spray applied at ambient conditions to test plaques of TPO (HIMONT RTA3263 commercially available from Standard Plaque, Inc.) to a dry film thickness of about 0.2 mils. The test plaques coated with Promoters A and B and the promoters of Examples 1 and 3 were flashed at ambient conditions for two minutes, while the test plaques coated with Promoters C, D, and E and the promoters of Examples 2 and 4 were force dried for six minutes at 180° F. (82° C.) to remove the water from the film. All the coated test plaques were then coated with a black basecoat, CBC-8555C, and a clearcoat, UCC-1001W, both commercially available from PPG Industries, Inc., then cured for 30 minutes at 265° F. (129° C.). The test plaques were then evaluated with the results listed below in Table I.

TABLE I

| Composition | Tricut Adhesion* | Adhesion-H* | Solvent Soak** |
|---|---|---|---|
| Promoter #1 from Example 1 | 0 | 0 | 60+ |
| Promoter #2 from Example 1 | 0 | 0 | 60+ |
| Promoter #3 from Example 1 | 0 | 0 | 60+ |
| Promoter #1 from Example 2 | 0 | 0 | 60+ |
| Promoter #2 from Example 2 | 0 | 0 | 60+ |
| Promoter #3 from Example 2 | 0 | 0 | 60+ |
| Promoter from Example 3 | 0 | 0 | 60+ |
| Promoter from Example 4 | 0 | 0 | 60+ |
| Promoter A | 100 | 100 | 3 |
| Promoter B | 0 | 0 | 19 |
| Promoter C | 0 | 0 | 10 |
| Promoter D | 0 | 0 | 35 |
| Promoter E | 0 | 0 | 25 |

*Results are reported as a percent failure. A rating of 100 means complete failure and a rating of 0 means no adhesion loss.
**Results are reported as minutes until failure. A result of 60+ means that the test was discontinued after 60 minutes and that the coated test plaque exhibited no adhesion loss or lifting of the film.

Table I shows that coating compositions of the present invention, adhesion promoter compositions of Examples 1 to 4, have excellent adhesion to TPO and exhibit a significant increase in gasoline resistance when compared to a commercial adhesion promoter, Promoter C, as evidenced by the 60+ results in the solvent soak test. Promoters A, B, D, and E which illustrate adhesion promoter compositions where the amount of polyhydroxylated polydiene polymer is outside the ranges of the claimed coating composition, do not exhibit a significant increase in gasoline resistance when compared to a commercial adhesion promoter. Promoter A has very poor adhesion to TPO and a decrease in gasoline resistance when compared to Promoter C.

What is claimed is:

1. A liquid coating composition, comprising:
   (a) from about 5 to 100 percent of resin solids of a mixture of (i) a substantially saturated polyhydroxylated polydiene polymer, where at least 90 percent of the double bonds of the polydiene are hydrogenated and where the polymer has terminal hydroxyl groups, and (ii) a chlorinated polyolefin, which is a modified chlorinated polyolefin resin prepared by grafting one or more compounds selected from unsaturated polycarboxylic acids and their acid anhydrides onto a chlorinated polyolefin resin to form an acid-and/or anhydride-modified chlorinated polyolefin resin, wherein the weight of the polydiene polymer is between about 5 and 95 percent of the total weight of the mixture of polyhydroxylated polydiene polymer and chlorinated polyolefin;
   (b) about 0 to about 95 percent by weight of resin solids of a resinous film former selected from liquid, organic solvent-reducible, and water-reducible film forming polymers; and
   (c) a solvent.

2. The liquid coating composition of claim 1 additionally comprising at least one pigment.

3. The liquid coating composition of claim 1 wherein the solvent is an organic solvent that makes the coating composition a solvent-based coating composition.

4. The liquid coating composition of claim 1 wherein the solvent is water so that the coating composition is an aqueous-based coating composition.

5. The liquid coating composition of claim 4 wherein the chlorinated polyolefin is an aqueous dispersion comprising water, a coalescing solvent, and a dispersed resinous phase having about 20 to about 100 percent by weight of an at least partially neutralized modified chlorinated polyolefin obtained by heating a chlorinated polyolefin with a hydrocarbon acid having at least 7 carbon atoms in the presence of a free radical initiator, said modified chlorinated polyolefin present in an amount of the about 20 to about 100 percent by weight of dispersed in water with an organic cosolvent.

6. The liquid coating composition of claim 1 wherein the substantially saturated polyhydroxylated polydiene polymer is a saturated polybutadiene diol polymer.

7. The liquid coating composition of claim 6 wherein the substantially saturated polyhydroxylated polydiene polymer has an hydroxyl equivalent weight of about 1500 to 3000.

8. The liquid coating composition of claim 1 wherein the resinous film former is selected from the group consisting of acrylic resins, alkyd resins, water-reducible acrylic resins, urethane resins, acrylic latices, and mixtures thereof.

9. The liquid coating composition of claim 8 wherein the resinous film former is present in an amount of about 40 to 85 percent by weight of resin solids.

10. The liquid coating composition of claim 1 wherein the mixture of (a) the polyhydroxylated polydiene polymer is present in the mixture of (i) and (ii) in an amount of from about 5 to about 70 percent by weight.

11. The liquid coating composition of claim 10 wherein the mixture of (a) the polyhydroxylated polydiene polymer is present in the mixture of (i) and (ii) in an amount of from about 5 to about 40 percent by weight.

12. The liquid coating composition of claim 1 wherein the (b) is about 0 to about 40 percent by weight of a water-reducible urethane resin; and about 0 to about 40 percent by weight of an acrylic latex.

13. The liquid coating composition of claim 1 wherein the modified chlorinated polyolefin is at least partially neutralized with an amine, and has a chlorine content of from about 10 to about 30 weight percent based on the weight of polyolefin, and has an acid value in the range of about 50 to about 100.

14. The liquid coating composition of claim 1 wherein the solids content thereof is in the range of about 20 to about 25 percent by weight based on total weight of the coating composition.

15. The liquid coating composition of claim 1 wherein the resinous film former is selected from the group consisting of polymeric materials selected from the group consisting of polymer emulsions, dispersions, suspensions, and solutions that upon removal of any solvents can coalesce to form a film.

16. A plastic article coated with a coating composition comprising:
   (a) from about 5 to 100 percent of resin solids of a mixture of (i) a substantially saturated polyhydroxylated polydiene polymer, where at least 90 percent of the double bonds of the polydiene are hydrogenated and where the polymer has terminal hydroxyl groups, and (ii) a chlorinated polyolefin, which is a modified chlorinated polyolefin resin prepared by grafting one or more compounds selected from unsaturated polycarboxylic acids and their acid anhydrides onto a chlorinated polyolefin resin to form an acid-and/or anhydride-modified chlorinated polyolefin resin, wherein the weight of the polydiene polymer is between about 5 and 95 percent of the total weight of the mixture of polyhydroxylated polydiene polymer and chlorinated polyolefin;

(b) about 0 to about 95 percent by weight of resin solids of a film forming polymer selected from liquid and water-reducible film forming polymers and polymeric materials selected from the group consisting of polymer emulsions, dispersions, suspensions, and solutions that upon removal of any solvents can coalesce to form a film; and (c) solvent selected from the group consisting of water and organic solvents.

17. The plastic article of claim 16 wherein the coating composition additionally comprises at least one pigment.

18. The plastic article of claim 16 wherein the saturated polyhydroxylated polydiene polymer of the coating composition is a saturated polybutadiene diol polymer having an hydroxyl equivalent weight of about 1500 to 3000.

19. The plastic article of claim 16 wherein the coating composition is present as a coating having a thickness of about 0.01 to 1.0 mils.

* * * * *

UNITED STATES PATENT AND TRADEMARK OFFICE
CERTIFICATE OF CORRECTION

PATENT NO. : 5,863,646
DATED : January 26, 1999
INVENTOR(S) : Verardi et al.

It is certified that error appears in the above-identified patent and that said Letters Patent are hereby corrected as shown below:

IN THE ABSTRACT:

Please amend the abstract in lines 9-11 to delete the words "and carrier-reducible film forming polymers; and (c) a carrier material" and replace it with --, solvent-reducible, or water-reducible film forming polymers; and (c) a solvent--.

Signed and Sealed this

Eighth Day of May, 2001

*Attest:*

NICHOLAS P. GODICI

*Attesting Officer*   *Acting Director of the United States Patent and Trademark Office*